July 27, 1971      D. M. SOWARDS      3,595,626

CERAMIC FILLERS AND COVERS FOR PACKED BEDS

Filed Nov. 14, 1968

INVENTOR
DONALD M. SOWARDS

BY  *Fred McKelvey*

ATTORNEY

United States Patent Office 3,595,626
Patented July 27, 1971

3,595,626
CERAMIC FILLERS AND COVERS FOR PACKED BEDS
Donald M. Sowards, Claymont, Del., assignor to E. I. du Pont de Nemours and Company, Wilmington, Del.
Filed Nov. 14, 1968, Ser. No. 775,750
Int. Cl. B01j 9/04
U.S. Cl. 23—283   6 Claims

ABSTRACT OF THE DISCLOSURE

Ceramic honeycomb placed within or on top of a packed bed, and particularly a catalytic bed, improves the effectiveness of the bed.

DESCRIPTION OF THE INVENTION

General

It has been found that the effectiveness of a packed bed may be improved by placing therein pieces of ceramic honeycomb. Packed beds are used in many chemical processing unit operations. Exemplary of such operations are catalytic converters, adsorption towers, scrubbing towers, aeraters, pebble heaters, and the like. It has also been found that ceramic honeycomb placed on top of a bed likewise results in efficient operation of the bed.

Ceramic honeycombs

Ceramic honeycomb structures are well known in the art. Methods for making said structures are also well known. For example, U.S. Pat. 3,112,184, issued Nov. 26, 1963 to Hollenbach, describes a method for making ceramic honeycomb. A suspension containing a finely divided sinterable ceramic material and a binding agent is applied to each side of a flexible carrier. The coated carrier is then corrugated and formed into a honeycomb. According to the disclosure, the carrier is preferably an organic fibrous material which will decompose under the conditions of sintering, but inorganic carriers can also be used. Also according to the disclosure, the method can be used to produce honeycomb of virtually any ceramic material; examples include glasses such as borosilicates, soda-lime-silicates, lead silicates, aluminosilicates, and alkaline earth silicates, and refractories such as sillimanite ($Al_2SiO_5$), magnesium silicate ($MgSiO_4$), magnesia (MgO), zircon ($ZrSiO_4$), zirconia ($ZrO_2$), petalite [$LiAl(Si_2O_5)_2$], spodumene [$(Li,Na)_2Al_2Si_4O_{12}$], cordierite [$Mg_4Al_8O_6(SiO_3)_{10}$], corundum ($\alpha$-alumina), and the glass ceramics.

British patent specification 931,096, published July 10, 1963, discloses a similar method for making honeycomb wherein flexible sheets containing sinterable ceramic particles are formed and corrugated, two or more such corrugated sheets are placed node to node, and the assembly is fired to sinter the ceramic particles and weld the sheets at points of contact. As a variation, alternate sheets of ceramic can be non-corrugated. The sheets are made by mixing the ceramic particles with plasticizing ingredients such as organic polymers and forming the mix into thin films. The film is preferably formed on a carrier such as a thin metal foil which provides a support during corrugation. After corrugation, the green film is removed from the support and is used in making a honeycomb structure. The structure is then fired to sinter the ceramic particles, resulting in a rigid honeycomb. This method, according to the disclosure, is also applicable to a wide range of sinterable ceramic materials.

Belgian Pat. 612,535, issued July 11, 1962, discloses a particularly suitable method for making the honeycomb, woven screen, and fiber batt structures used in this invention. In this method, the appropriate aluminum sheet, wire or wool is fabricated into the proper structure and is fired under controlled conditions to oxidize the aluminum to alpha alumina. Prior to the firing step, the aluminum is coated with an agent, identified in the patent as a fluxing agent, which serves to prevent inhibition of oxidation due to oxide scum formation on the surface of the aluminum. Examples of fluxing agents disclosed in the patent as being suitable include alkali metal and alkaline earth metal oxides and precursors of these oxides, i.e., compounds which yield the oxides on firing. A particularly suitable agent is sodium oxide ($Na_2O$) which is applied as sodium silicate ($Na_2SiO_3$). The honeycomb products resulting from this process are substantially pure alpha alumina. If desired, the chemical composition of the structures can be modified by including in the coating composition finely divided particles of filler refractory oxide. The filler refractories may, if desired, be one or more of those which will react with the alumina as it is formed. If a reactive filler such as magnesia and/or silica is used, the honeycomb structure will contain the corresponding reaction product such as spinel ($MgAl_2O_4$) cordierite or mullite ($3Al_2O_3 \cdot 2SiO_2$). The products of this process are characterized by outstanding strength and thermal shock resistance.

As disclosed in the Belgian patent, the honeycomb structures may be fabricated by corrugating sheets of aluminum foil coated with fluxing agent and placing the coated sheets together node to node. Where sodium silicate solution is used as the fluxing agent, the body will have sufficient green strength to maintain its shape until it is fired. Alternatively, the honeycomb structure may first be fabricated from the aluminum foil using methods well known in the art and described in the patent literature. For general disclosure on the art of making honeycomb, reference is made to U.S. Pat. Nos. 2,610,934, 2,674,295, and 2,734,843. For instruction on making slant-cell honeycomb, reference is made to U.S. Pat. No. 3,006,798. Suitable prefabricated aluminum honeycomb structures for use in this process are available commercially. Structures with nominal cell sizes ranging from $\frac{1}{8}''$ up to $\frac{3}{4}''$ and foil thickness of 0.7 mil to 7 mils are readily available. Other sizes with cells ranging from say $\frac{1}{32}''$ up to 2'' or higher and with foil up to $\frac{1}{4}''$ in thickness can be made and used in the process disclosed in the Belgian patent. The preferred structures are prepared using foil of about 2 mils thick.

An improvement in the process for making honeycomb structures by the method of the Belgian patent is disclosed in U.S. application Ser. No. 367,856, filed May 15, 1964, now abandoned. In the process of this application, the composition used to coat the aluminum honeycomb structure contains, in addition to the fluxing agent and filler refractory, if any, small amounts of a vanadium compound. The products of the Belgian patent are characterized by having a double-walled structure. The double wall results from the fact that the aluminum foil, as it melts, flows outwardly through the oxide formed on the outer surfaces of the foil and is oxidized at the outer surface of the oxide layer, thus leaving a large void in the final product corresponding approximately in thickness to the thickness of the original aluminum foil. The inclusion of the vanadium compound in the coating composition causes the formation of bridges of refractory material between these double walls, resulting in a product having even greater strength and thermal shock resistance than the products of the Belgian patent.

A further improvement in the process of the Belgian patent is disclosed in copending U.S. application Ser. No. 471,738, filed July 13, 1965, now U.S. Pat. 3,473,987. In the process of this application, the composition used to coat the aluminum honeycomb structure contains aluminum powder in addition to the fluxing agent and filler refractory, if any. The aluminum powder, of course, is oxidized to alumina during firing along with the aluminum in the original metal honeycomb. This method provides structures which are similar to those of the Belgian patent in that they are double-walled, but the walls can be made much thicker than the central void. Thus, the products are stronger than those of the Belgian patent.

A particularly preferred method for making mullite honeycomb is disclosed in application Ser. No. 449,629, filed Apr. 20, 1965, now abandoned. The method is similar to that disclosed in Ser. No. 471,738, but silicon carbide (SiC) is added to the composition used to coat the aluminum metal honeycomb. Upon firing, the silicon carbide reacts with the aluminum to provide mullite.

A further suitable method for making ceramic honeycomb is disclosed in U.S. Pat. 3,338,995 issued Aug. 27, 1967. In this method a "fugitive" material, e.g. paper, is coated with a composition including aluminum powder, a binder, a fluxing agent (of the type disclosed in the Belgian patent) and a liquid carrier. The "fugitive" material may be first coated then used to fabricate a honeycomb, or the honeycomb may be first fabricated from the fugitive material, then coated. In either case, the coated structure is fired in oxygen to burn out the fugitive material and oxidize the aluminum. Filler refractories can, of course, be included in the coating compositions to provide ceramics including compounds and/or solid solutions of alumina with other oxides.

Honeycomb structures of this invention can vary widely in honeycomb cell size and wall thickness. The methods mentioned and described briefly above can be used to provide honeycombs of virtually any dimensions. The overall size of the honeycomb structures will vary depending upon the application—i.e., the surface area desired, the permissible pressure drop, the cross-section of the vessel, and the like. Cell size and wall thickness will depend upon similar considerations and also upon the ruggedness required of the structures. In general, when the honeycomb is dispersed in the catalyst, the structures will range in overall size between about $\frac{1}{8}$ and 250 cubic inches, preferably between about 1 and about 10 cubic inches. Cell size (average dimension normal to longitudinal cell axis) can range from as low as about $\frac{1}{32}''$ or below up to about 2" or higher. In applications where high surface area is more important than low pressure drop, the $\frac{1}{32}''$ cell size is preferred. The 2" cell size, of course, provides extremely low pressure drop, but at the expense of surface area. For most applications wherein both surface area and pressure drop are significant, cell sizes between $\frac{1}{16}''$ and $\frac{3}{4}''$ are preferred.

Cell walls in the honeycomb structures of the invention can range from 1 mil up to 200 mils or more, but for optimum combination of strength, pressure drop, and surface area, wall thicknesses in the range 5 to 100 mils are preferred. Wall thickness will, of course, vary with cell size, and a convenient way of expressing the relationship is in terms of percent open area transverse to the longitudinal axes of the honeycomb cells. Thus, the open area should range between about 40 and about 95 percent, and preferably between 70 and 90 percent.

Description of the drawings

The honeycomb ceramics can be used in many environments in different shapes and sizes. Several suggested embodiments are illustrated in the drawings.

Figure 1:
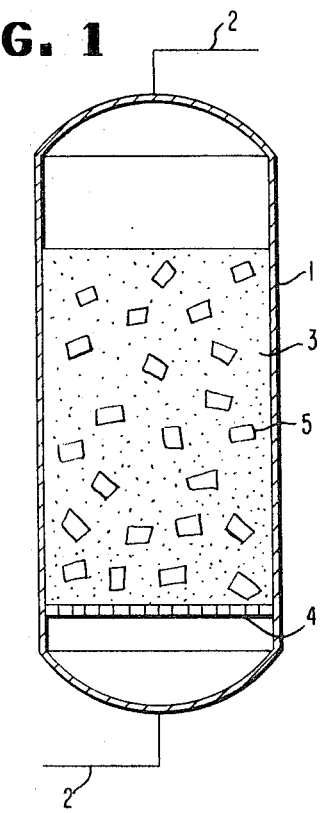
FIG. 1 shows a vessel 1 containing suitable inlet and outlet means 2 with a packed bed 3 supported by a bed supporter 4. Intimately admixed with the packing throughout the bed are various pieces of ceramic honeycomb 5.

As is apparent from the drawings, the honeycomb may be present in the packed bed in many fashions. When dispersed throughout the bed, the honeycomb may be smaller, the same size, or larger than the catalyst pellets.

Utility of packed beds

The packed beds system of the invention may be used in many processes where beds are used such as in ammonia oxidation reactions, dehydrogenation of alkanes and alkenes, hydrogen cyanide converters, gas adsorption and scrubbing towers. When the packed beds are used as beds for a catalytic conversion operation, any suitable catalyst may be used and the particular catalyst and form thereof is dependent largely upon the particular reaction or operation involved. When the ceramic honeycomb is used as a cover as in FIG. 4, it serves as a gas flow straightener and distributor. It also serves as an insulator for the bed and reduces losses due to heat radiation. It further protects any catalyst particles from coming into contact with large solid particles in the gas stream which in turn minimizes poisoning of the catalyst. Ceramic honeycomb dispersed throughout the bed, as in FIGS. 1 or 3 keeps it open, i.e., prevents plugging and/or channeling. In addition, it has been discovered that dispersed honeycomb tends to prevent sintering of any catalyst material. The use of alternate layers of honeycomb and catalyst gauze as in FIG. 2 is particularly desirable where it is necessary to prevent plugging in the gauze.

Another advantage lies in the fact that in many instances the presence of the ceramic honeycomb tends to aid in operations used for the regeneration of the catalyst. It is clear that combinations of the embodiments shown in the drawings may be used. For example, one could combine the ideas of FIGS. 1 and 3 and incorporate pieces of honeycomb 5 within catalytic bed 13 of FIG. 3.

Figure 3:
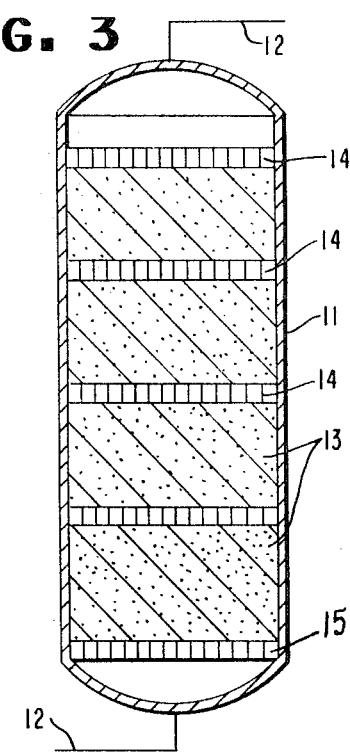
FIG. 3 shows a packed tower 11 containing suitable inlet and outlet means 12. Throughout the packed bed 13 are various layers of honeycomb 14. Item 15 is a support for the bed which may be a honeycomb structure or any other suitable support material.

The arrangements of FIGS. 1 and 3 are particularly useful in the conversion of butene to butadiene, wherein carbonization requires the periodic regeneration of the bed by steaming to prevent plugging and to keep the catalyst from coating over. In such a process, the catalyst particle size can range from $\frac{1}{2}''$ to 1" diameter. The honeycomb blocks can have a minimum dimension of about 1" and a maximum dimension of about 3" with cell dimensions ranging from $\frac{3}{16}''$ to $\frac{1}{4}''$. The open, low heat capacity honeycomb filler permits longer runs between regeneration steps as well as facilitating a more rapid regeneration operation. Similar improvements are found in the hydrogenation and isomerization of mixtures of organic compounds; particularly in cases where regeneration is required to remove polymeric by products or tars.

Figure 2:
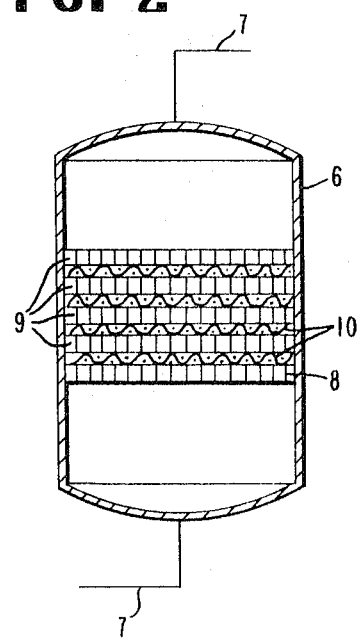
FIG. 2 shows a vessel 6 containing inlet and outlet means 7 and a catalyst support 8. On top of the support are alternate layers of ceramic honeycomb 9 and catalytic gauze 10. Each layer of ceramic honeycomb may be an integral unit or several pieces of honeycomb.

The arrangement of FIG. 2 is useful where metal fiber, wire, wool, gauze, or elongated particle catalyst packs are employed. In a process for making hydrogen cyanide (HCN) from methane ($CH_4$), ammonia ($NH_3$), and air, 3 layers of 80 mesh platinum gauze can be used. Placing ceramic honeycomb fillers between the individual gauzes prevents them from sintering together and also prevents the pack from becoming plugged.

In a process for making nitric acid ($HNO_3$) from ammonia and air, about 30 layers of 40 mesh platinum-rhodium gauze is used as the catalyst. The use of 6 to 20 mesh ceramic screen between the gauzes not only protects them from welding and plugging, but also permits the easy removal and replacement of damaged layers of gauze.

The concept of this invention can be used in the production of formaldehyde ($CH_2O$) by the oxidation of methanol ($CH_3OH$). Gauzes, wool, or needles of silver, copper, or their alloys are used as the catalyst pack. The use of about 1/8" to 1/4" cell size ceramic honeycomb increases the rate at which the gases can be processed; increases the stability of the bed with respect to changes in back pressure and activity; and permits easier replacement or repair of the bed when it is damaged or becomes inactive.

The arrangement of FIG. 1 is also useful in large fixed beds to promote good distribution of process fluids and to physically stabilize the packing against densification and/or plugging. Such beds may be used for adsorption, filtration, heating or cooling of fluids, as well as catalytic reactors.

Figure 4:
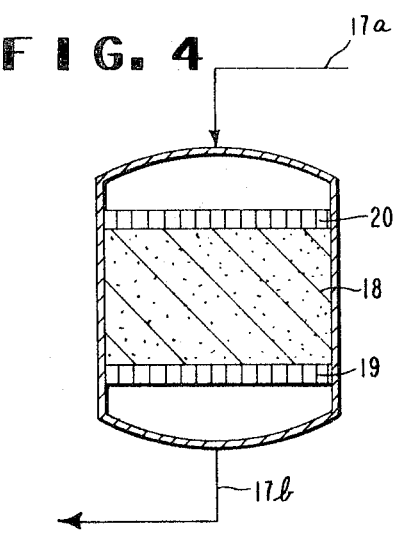
FIG. 4 shows a vertical tower 16 having suitable inlet 17a and outlet 17b means. The packed bed 18 is supported by support 19. A ceramic honeycomb structure 20 is disposed between inlet means 17a and the packed bed 18.

The arrangements of FIGS. 3 and 4 are useful whenever the intermingling of gases and liquids are important in the process involved.

I claim:
1. In a packed bed apparatus adapted for use in chemical process unit operations comprising:
   (1) a shell;
   (2) means adapted for introducing fluids into and out of said shell;
   (3) a packed bed; and
   (4) a support for said packed bed,
the improvement comprising: said packed bed having the form of an intimate admixture of packing material and ceramic honeycomb.

2. The apparatus of claim 1 wherein said ceramic honeycomb is substantially pure alpha alumina.

3. The apparatus of claim 1 wherein said ceramic honeycomb is mullite.

4. In a reactor adapted for use in catalytic conversion processes comprising:
   (1) a shell;
   (2) means adapted for introducing fluids into and out of said shell;
   (3) a catalytic bed; and
   (4) a support for said catalytic bed,
the improvement comprising: said catalytic bed having the form of an intimate admixture of active catalytic material and ceramic honeycomb.

5. The reactor of claim 4 wherein said ceramic honeycomb is substantially pure alpha alumina.

6. The reactor of claim 4 wherein said ceramic honeycomb is mullite.

References Cited

UNITED STATES PATENTS

| | | | |
|---|---|---|---|
| 723,596 | 3/1903 | Ferguson | 23—288X |
| 2,930,184 | 3/1960 | Plescia et al. | 23—288X |
| 2,979,315 | 4/1961 | Eckert | 261—94 |
| 3,110,569 | 11/1963 | Carter | 23—288 |
| 3,423,185 | 1/1969 | Ballard et al. | 23—288 |

OTHER REFERENCES

"'Torvex' Ceramic Honeycomb," Bulletin No. A–56299, E. I. du Pont de Nemours Co., September 1967.

JOSEPH SCOVRONEK, Primary Examiner

D. G. MILLMAN, Assistant Examiner

U.S. Cl. X.R.

23—288; 261—94